US009868883B2

(12) United States Patent
Kim et al.

(10) Patent No.: US 9,868,883 B2
(45) Date of Patent: *Jan. 16, 2018

(54) PRESSURE-SENSITIVE ADHESIVE COMPOSITION

(71) Applicant: LG CHEM, LTD., Seoul (KR)

(72) Inventors: Kee Young Kim, Daejeon (KR); No Ma Kim, Daejeon (KR); In Ho Hwang, Daejeon (KR); In Kyu Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,993

(22) Filed: Nov. 19, 2014

(65) Prior Publication Data

US 2015/0368520 A1 Dec. 24, 2015

Related U.S. Application Data

(63) Continuation of application No. PCT/KR2014/005445, filed on Jun. 19, 2014.

(30) Foreign Application Priority Data

Jun. 19, 2013 (KR) ........................ 10-2013-0070504
Jun. 19, 2013 (KR) ........................ 10-2013-0070512

(51) Int. Cl.
| | |
|---|---|
| C09J 9/02 | (2006.01) |
| G02B 1/18 | (2015.01) |
| C09J 133/06 | (2006.01) |
| C09J 133/14 | (2006.01) |
| C09J 7/02 | (2006.01) |
| C08K 5/3435 | (2006.01) |
| C09J 11/06 | (2006.01) |
| C09J 133/08 | (2006.01) |
| G02B 1/10 | (2015.01) |
| H04B 1/3888 | (2015.01) |
| G02B 1/14 | (2015.01) |
| G02B 1/16 | (2015.01) |

(52) U.S. Cl.
CPC .............. C09J 9/02 (2013.01); C08K 5/3435 (2013.01); C09J 7/0217 (2013.01); C09J 11/06 (2013.01); C09J 133/066 (2013.01); C09J 133/08 (2013.01); C09J 133/14 (2013.01); G02B 1/105 (2013.01); G02B 1/14 (2015.01); G02B 1/16 (2015.01); G02B 1/18 (2015.01); H04B 1/3888 (2013.01); C09J 2201/122 (2013.01); C09J 2201/128 (2013.01); C09J 2201/606 (2013.01); C09J 2203/318 (2013.01); C09J 2433/00 (2013.01); G02F 2202/28 (2013.01); Y10T 428/1462 (2015.01); Y10T 428/2848 (2015.01); Y10T 428/2887 (2015.01); Y10T 428/2891 (2015.01); Y10T 428/31935 (2015.04); Y10T 428/31938 (2015.04)

(58) Field of Classification Search
None
See application file for complete search history.

(56) References Cited

U.S. PATENT DOCUMENTS

| | | | | |
|---|---|---|---|---|
| 7,842,742 | B2 * | 11/2010 | Amano | C09J 7/0217 156/327 |
| 9,365,752 | B2 * | 6/2016 | Park | C09J 133/14 |
| 2002/0085284 | A1 * | 7/2002 | Nakamura | G02B 1/11 359/601 |
| 2004/0142116 | A1 * | 7/2004 | Nishikawa | C09K 19/2007 428/1.1 |
| 2007/0146887 | A1 * | 6/2007 | Ikeda | G02B 1/111 359/586 |
| 2008/0311395 | A1 * | 12/2008 | Ukei | C08K 3/0083 428/354 |
| 2009/0163626 | A1 * | 6/2009 | Ukei | B32B 27/06 524/99 |
| 2010/0238384 | A1 * | 9/2010 | Tochigi | G02B 5/0226 349/96 |
| 2011/0217542 | A1 | 9/2011 | Moroishi et al. | |
| 2013/0027620 | A1 | 1/2013 | Kim et al. | |
| 2016/0376480 | A1 * | 12/2016 | Bae | C09D 133/066 428/41.7 |

FOREIGN PATENT DOCUMENTS

| | | |
|---|---|---|
| CN | 1872935 A | 12/2006 |
| CN | 101784629 A | 7/2010 |
| CN | 102516902 A | 6/2012 |
| CN | 102746811 A | 10/2012 |

(Continued)

OTHER PUBLICATIONS

Abstract of JP405140519A, published Jun. 8, 1993.*
J. Plank et al., "Synthesis and performance of methacrylic ester based polycarboxylate superplasticizers possessing hydroxy terminated poly(ethylene glycol) side chains", Cement and Concrete Research, 38, 2008, pp. 1210-1216.*
Product data sheet "Poly(ethylene glycol) methyl ether methacrylate" from Sigma-Aldrich, retrived on Dec. 16, 2015.*
Product data sheet "Poly(ethylene glycol) methacrylate" from Sigma-Aldrich, retrived on Dec. 18, 2015.*

(Continued)

Primary Examiner — Anish P Desai
(74) Attorney, Agent, or Firm — Dentons US LLP

(57) ABSTRACT

Provided are a pressure-sensitive adhesive composition, a protective film, an optical device, and a display device. The pressure-sensitive adhesive composition may exhibit suitable low speed and high speed peel-off strengths after forming a crosslinking structure, and have an excellent balance between them. Accordingly, the pressure-sensitive adhesive composition may exhibit an excellent protective effect when applied to a protective film, may be easily peeled in a high speed peel-off and thus advantageous for the high speed process, and may exhibit an excellent antistatic characteristic.

15 Claims, No Drawings

(56) References Cited

FOREIGN PATENT DOCUMENTS

| | | |
|---|---|---|
| EP | 1621596 A2 | 2/2006 |
| EP | 2484734 A2 | 8/2012 |
| JP | 5140519 A | 6/1993 |
| JP | 2013-107977 A | 6/2013 |
| JP | 2013-185007 A | 9/2013 |
| JP | 5490370 A | 3/2014 |
| KR | 1020000009647 A | 2/2000 |
| KR | 1020000018983 A | 4/2000 |
| KR | 1020000019116 A | 4/2000 |
| KR | 1020010111362 A | 12/2001 |
| KR | 1020020008267 A | 1/2002 |
| KR | 1020020066505 A | 8/2002 |
| KR | 1020030068335 A | 8/2003 |
| KR | 1020040030919 A | 4/2004 |
| KR | 1020040083916 A | 10/2004 |
| KR | 1020040085484 A | 10/2004 |
| KR | 1020060128659 A | 12/2006 |
| KR | 1020070101001 A | 10/2007 |
| KR | 1020080005722 A | 1/2008 |
| KR | 1020080063107 A | 7/2008 |
| KR | 1020080101801 A | 11/2008 |
| KR | 1020090049557 A | 5/2009 |
| KR | 1020110095004 A | 8/2011 |
| KR | 1020110095464 A | 8/2011 |
| KR | 1020110095820 A | 8/2011 |
| KR | 1020120007466 A | 1/2012 |
| KR | 10-2012-0110032 A | 10/2012 |
| KR | 1020130013995 A | 2/2013 |
| TW | I379875 B1 | 12/2012 |
| TW | I384049 B | 2/2013 |
| WO | 2009/091171 A2 | 7/2009 |
| WO | 2012064141 A2 | 5/2012 |
| WO | WO 2013095064 A1 * | 6/2013 ............ C09J 133/14 |

OTHER PUBLICATIONS

Nana, Nishitsuji, et al., "Pressure Sensitive Adhesive Agent Composition for Surface Protecting Sheet, and Surface Protecting Sheet Using the Same", English translation of JP2008-248223A, published on Oct. 16, 2008.*

Machine translation of KR 2011-0095004A ("Anti-glare film and anti-glare composition for preparing the same"), published on Aug. 24, 2011.*

Nana, NishiTsuji et al., "Pressure Sensitive Adhesive Agent Composition for Surface Protecting Sheet, and Surface Protecting Sheet Using the Same", English translation of JP 2008-248223A, published Oct. 16, 2008.*

Takeshi Nagakura et al., "Adhesive Composition and Surface Protection Film", English translation of JP 2013-107977A, published on Jun. 6, 2013.*

* cited by examiner

PRESSURE-SENSITIVE ADHESIVE COMPOSITION

This application is a bypass continuation application of International Application No. PCT/KR2014/005445, filed on Jun. 19, 2014, which claims priority to and the benefit of Korean Patent Application Nos. 10-2013-0070504, filed Jun. 19, 2013 and 10-2013-0070512, filed Jun. 19, 2013, the disclosures of which are incorporated herein by reference in their entirety.

FIELD

The present application relates to a pressure-sensitive adhesive composition, a film for protecting an optical device, an optical device, and a display device.

BACKGROUND

A protective film may be used to prevent adhesion of contaminants such as dust and scratches on optical devices such as a polarizing plate, various plastic products, electric products, or automobiles. Suitable peel-off strength and antistatic property may be required for the protective film.

For example, when the protective film is peeled at a high speed, a low peel-off strength (hereinafter, referred to as a "high speed peel-off strength") is required. However, when the protective film is peeled at a low speed, a suitable protecting function may be exhibited due to a high peel-off strength (hereinafter, referred to as a "low speed peel-off strength").

Usually, due to static electricity generated in peeling of the protective film, contaminants such as dust may be sucked, destruction of static electricity of a device, if it is an electronic product, or malfunction may occur. Particularly, recently, as components are integrated due to supply of a computer, and multifunctionalization of a liquid crystal TV or a mobile phone, problems caused by static electricity may be being further magnified.

Accordingly, attempts to provide an antistatic function to a pressure-sensitive adhesive included in the protective film are progressing.

For example, there is an attempt to inhibiting generation of static electricity by adding an ethyleneoxide-modified phthalic acid dioctyl plasticizer to a pressure-sensitive adhesive in the patent document 1. In addition, in the patent document 2, an organic salt is mixed to a pressure-sensitive adhesive, and in the patent document 3, a metal salt and a chelating agent are mixed to a pressure-sensitive adhesive. However, according to the above-methods, contamination caused by transfer of a pressure-sensitive adhesive component to a product to be protected occurs, inhibition of static electricity generated in an early stage is difficult, and a low speed peel-off strength critical to obtain a protective function is excessively reduced.

PRIOR ART DOCUMENTS

Patent Documents

PATENT DOCUMENT 1: Japanese Laid-open Patent Application No. 1993-140519
PATENT DOCUMENT 2: Korean Unexamined Patent Application Publication No. 2004-0030919
PATENT DOCUMENT 3: Korean Unexamined Patent Application Publication No. 2006-0128659

DESCRIPTION

Object

The present application provides a pressure-sensitive adhesive composition, a film for protecting an optical device, an optical device, and a display device.

Solution

In one aspect, the present application provides a pressure-sensitive adhesive composition, which may include a polymer and a crosslinking agent. The polymer may have a crosslinking point, and implement a crosslinking structure by a crosslinking reaction with the crosslinking agent.

The polymer may include a polymerization unit of a hydroxyalkyl (meth)acrylate, and a polymerization unit of a monomer having a hydroxyl group at the end and including an alkyleneoxide chain. Here, there may be a difference between the number of carbon atoms of an alkyl group of the hydroxyalkyl (meth)acrylate, and the number of carbon atoms present at a side chain of the monomer having a hydroxyl group at the end and including an alkyleneoxide chain. The term "monomer" used herein includes all types of compounds that can form a polymer through a polymerization reaction, and a polymerization unit of a monomer refers to a state in which a monomer is polymerized and included in a backbone of a side chain or a main chain of a polymer. In addition, unless particularly defined otherwise, the expression "a polymer includes, contains, or has a monomer" may mean that the monomer is included, contained, or had as a polymerization unit.

For example, the hydroxyalkyl (meth)acrylate may include an alkyl group having 1 to 3 carbon atoms, and the monomer having a hydroxyl group at the end and including an alkyleneoxide chain may be a monomer represented by Formula 1. Hereinafter, for convenience, the monomer having a hydroxyl group at the end and including an alkyleneoxide chain may be referred to as a crosslinkable polar monomer.

Here, the hydroxyalkyl (meth)acrylate may be, but is not limited to, hydroxymethyl (meth)acrylate, 2-hydroxyethyl (meth)acrylate, or 2-hydroxypropyl (meth)acrylate. The term "(meth)acrylate" may be acrylate or methacrylate.

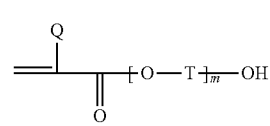

[Formula 1]

In Formula 1, Q is hydrogen or an alkyl group, T is an alkylene group, and m is a number of 1 to 16. Here, m may be, for example, a number of 1 to 16, 1 to 12, 4 to 16, 4 to 12, 4 to 10, or 4 to 8. In such a range, polymerization efficiency in preparation of the polymer and crystallinity of a polymer may be maintained in a suitable range, and suitable conductivity may be provided to a pressure-sensitive adhesive.

In Formula 1, when at least two of the [—O-T-] units are present, the number of carbon atoms of T in each unit may be the same as or different.

The term "alkyl group" used herein may mean, unless particularly defined otherwise, an alkyl group having 1 to 20, 1 to 16, 1 to 12, 1 to 8, or 1 to 4 carbon atoms. The alkyl group may be linear, branched, or cyclic. The alkyl group may be unsubstituted, or substituted by at least one substituent.

The term "alkylene group or alkylidene group" used herein may be, unless particularly defined otherwise, an alkylene group or an alkylidene group having 1 to 20, 1 to 16, 1 to 12, 1 to 8, or 1 to 4 carbon atoms. The alkylene group or alkylidene group may be linear, branched, or cyclic. The alkylene group or alkylidene group may be substituted by at least one substituent when needed.

In another embodiment, in Formula 1, Q is an alkyl group, for example, an alkyl group having 1 to 8 or 1 to 4 carbon atoms. When a compound in which Q is an alkyl group is used, for example, a pressure-sensitive adhesive composition is applied to a protective film, and it can be advantageous in that the protective film is easily removed without a residue or stains on an adherend.

The "aryl group" used herein may be, unless particularly defined otherwise, a monovalent residue derived from a compound including a structure in which a benzene ring is included, or at least two benzene rings are connected or at least two benzene rings are condensed or bound to each other with sharing one or at least two carbon atoms, or a derivative thereof. The aryl group may be, for example, an aryl group having 6 to 25, 6 to 22, 6 to 16, or 6 to 13 carbon atoms. The aryl group may be a phenyl group, a phenylethyl group, a phenylpropyl group, a benzyl group, a tolyl group, a xylyl group, or a naphthyl group.

In the specification, a specific functional group, for example, a substituent that can be substituted to the alkyl group, the alkylidene group, or the alkylene group, may be, but is not limited to, an alkyl group, an alkoxy group, an alkenyl group, an epoxy group, a cyano group, a carboxyl group, an acryloyl group, a methacryloyl group, an acryloyloxy group, a methacryloyl group, or an aryl group.

In Formula 1, T may be a linear alkylene group.

In Formula 1, the number (that is, a number calculated by $\lceil m \times c_1 \rceil$) of carbon atoms at the side chain, which is calculated from the number (c) of carbon atoms of the alkylene group of T, is 4 or more. The number (that is, a number calculated by $\lceil m \times c_1 \rceil$) of carbon atoms at the side chain of the monomer of Formula 1 may be 4 to 20, 4 to 16, 4 to 12, 4 to 8, or 4 to 6. When the number of the carbon atoms at the side chain in the monomer of Formula 1 is calculated, the number of carbon atoms in a linear alkylene group is only considered, and for example, when a substituent including a carbon is substituted to the alkylene group of T, the number of carbon atoms in the substituent is not considered. As described above, a pressure-sensitive adhesive having an excellent peel-off strength, that is, an excellent balance between high speed and low speed peel-off strengths may be provided.

The compound of Formula 1 may be, but is not limited to, hydroxy dialkyleneglycol (meth)acrylic ester, hydroxy trialkyleneglycol (meth)acrylic ester, or hydroxy tetraalkyleneglycol (meth)acrylic ester.

The polymer may include a polymerization unit of 1 to 10 parts by weight of a hydroxyalkyl (meth)acrylate and a polymerization unit of 1 to 10 parts by weight of a crosslinkable polar monomer. The term "parts by weight" used herein refers to, unless particularly defined otherwise, a weight ratio between components. Accordingly, for example, the above-described "parts by weight" may mean that the polymer is formed from a mixture of the hydroxyalkyl (meth)acrylate and a monomer including the crosslinkable polar monomer in a ratio (A:B) of a weight (A) of the hydroxyalkyl (meth)acrylate to a weight (B) of the crosslinkable polar monomer of 1 to 10:1 to 10.

As the weight ratio of the hydroxyalkyl (meth)acrylate and the crosslinkable polar monomer is controlled as described above, a pressure-sensitive adhesive exhibiting a suitable antistatic performance, and a suitable balance between high speed and low speed peel-off strengths without remaining contaminants during a peel-off may be provided.

To ensure an optimal range of all physical properties including a pressure-sensitive adhesive performance, and a peel-off characteristic, that is, an excellent balance between low speed and high speed peel-off strengths, the weight ratio of the hydroxyalkyl (meth)acrylate and the crosslinkable polar monomer in the polymer may be controlled. For example, the ratio (A/B) of the weight (A) of the hydroxyalkyl (meth)acrylate and the weight (B) of the crosslinkable polar monomer in the polymer may be more than 1. In another embodiment, the ratio may be approximately 1.1 or more. In another embodiment, the ratio may also be 25 or less, 20 or less, 15 or less, 10 or less, approximately 8 or less, or approximately 5 or less. Therefore, in such a range, the pressure-sensitive adhesive exhibiting a suitable antistatic performance and a suitable balance between high speed and low speed peel-off strengths without remaining contaminants during peeling may be provided.

The polymer may further include a (meth)acrylic ester monomer, for example, a polymerization unit of an alkyl (meth)acrylate.

In consideration of a cohesive strength, a glass transition temperature, or a pressure-sensitive adhesive property of the pressure-sensitive adhesive, the alkyl (meth)acrylate may be an alkyl (meth)acrylate having an alkyl group having 1 to 14 carbon atoms. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, or tetradecyl (meth)acrylate, from which one or at least two thereof may be included in the polymer as a polymerization unit.

The polymer may include, for example, 80 to 98 parts by weight of the (meth)acrylic ester monomer or 85 to 95 parts by weight of the polymerization unit. That is, for example, the polymer may be formed from a mixture of monomers including the above-described monomers in a ratio (A:B:C) of a weight (A) of a hydroxyalkyl (meth)acrylate, a weight (B) of a crosslinkable polar monomer, and a weight (C) of the (meth)acrylic ester monomer of 1 to 10:1 to 10:80 to 98. However, the weight ratio may be changed in consideration of, for example, specific types of respective monomers according to necessity.

The polymer may further include a polymerization unit induced from a known monomer used for preparing a pressure-sensitive adhesive polymer, for example, a carboxyl group-containing monomer such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, or maleic anhydride; a monomer having an isocyanate group; a monomer having a glycidyl group such as glycidyl (meth)acrylate; a radical polymerizable monomer including a nitrogen atom such as (meth)acrylamide, N-vinyl pyrrolidone, or N-vinyl caprolactam; or a radical polymerizable monomer such as styrene. For example, the polymer may include a polymerization unit induced from the above-described monomer at 20 parts by weight or less.

The polymer may be prepared by selecting a suitable monomer from the above-described monomers, and applying a mixture of the selected monomers in a desired ratio in a polymerization method such as solution polymerization, photo polymerization, bulk polymerization, suspension polymerization, or emulsion polymerization.

The pressure-sensitive adhesive composition may include a crosslinking agent, and react with a crosslinking point of the polymer, for example, a hydroxyl group included in the first and/or crosslinkable polar monomer, thereby implementing a crosslinking structure.

As the crosslinking agent, an aliphatic isocyanate crosslinking agent may be used. When such a crosslinking agent implements a crosslinking structure with the above-described polymer, a pressure-sensitive adhesive having a required antistatic characteristic as well as suitable low speed and high speed peel-off strengths may be implemented.

For example, as the crosslinking agent, a crosslinking agent including an aliphatic cyclic isocyanate compound and/or an aliphatic non-cyclic isocyanate compound may be used. Here, the term "aliphatic cyclic isocyanate compound" may refer to an isocyanate compound including a cyclic structure, which does not correspond to an aromatic ring, and the "aliphatic non-cyclic isocyanate compound" may refer to, for example, an aliphatic linear or branched isocyanate compound. Here, the aliphatic cyclic isocyanate compound may be, for example, an isocyanate compound such as isophorone diisocyanate, or methylene dicyclohexyl diisocyanate or cyclohexane diisocyanate, a derivative such as a dimer or trimer thereof, or a reaction product of any one of the above compounds with a polyol (e.g., trimethylolpropane), and the "aliphatic non-cyclic isocyanate compound" may be an alkylene diisocyanate compound having 1 to 20, 1 to 16, 1 to 12, or 1 to 8 carbon atoms such as hexamethylene diisocyanate, a derivative such as a dimer or trimer thereof, or a reaction product of any one of the above compounds with a polyol (e.g., trimethylolpropane), but the present application is not limited thereto.

Here, when the aliphatic cyclic isocyanate compound and the aliphatic non-cyclic isocyanate compound are used together, the ratios are not particularly limited, and may be appropriately selected according to necessity. Conventionally, the crosslinking agent may include approximately 1 to 500 parts by weight or 20 to 300 parts by weight of the aliphatic non-cyclic isocyanate compound relative to 100 parts by weight of the aliphatic cyclic isocyanate compound. As the crosslinking agent, that is, as the crosslinking agent including an aliphatic cyclic isocyanate compound and an aliphatic non-cyclic isocyanate compound, commercially available one, for example, MHG-80B and Duranate P produced by Asahi or NZ-1 produced by BAYER may be used.

When additionally needed, a known crosslinking agent such as an epoxy crosslinking agent such as ethyleneglycol diglycidylether, triglycidylether, trimethylolpropane triglycidylether, N,N,N',N'-tetraglycidyl ethylenediamine, or glycerin diglycidylether; an aziridine crosslinking agent such as N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine), or tri-1-aziridinyl phosphine oxide; or a metal chelate crosslinking agent such as a compound prepared by coordinating a multifunctional metal such as aluminum, iron, zinc, tin, titanium, antimony, magnesium, and/or vanadium to acetyl acetone or ethyl acetoacetate may also be used.

The pressure-sensitive adhesive composition may include a crosslinking agent at 0.01 to 10, 0.1 to 10, 1 to 10, 0.01 to 5, 0.1 to 5, or 1 to 5 parts by weight relative to 100 parts by weight of the polymer. In such a range, a suitable crosslinking structure may be implemented, and the low speed and high speed peel-off strengths of the pressure-sensitive adhesive may be controlled in a desired range.

The pressure-sensitive adhesive composition may further include an antistatic agent. As the antistatic agent, for example, an ionic compound may be used.

As the ionic compound, for example, a metal salt may be used. The metal salt may include, for example, an alkali metal cation or an alkali earth metal cation. The cation may be one or at least two of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$), and a barium ion ($Ba^{2+}$), preferably, one or at least two of a lithium ion, a sodium ion, a potassium ion, a magnesium ion, a calcium ion, and a barium ion, and more preferably, a lithium ion in consideration of ion stability and mobility.

The anion included in the ionic compound may be $PF_6^-$, $AsF^-$, $NO_2^-$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3$ ($C_6H_4$)$SO_3^-$), p-toluenesulfonate ($CH_3C_6H_4SO_3^-$), tetraborate ($B_4O_7^{2-}$), carboxybenzenesulfonate (COOH($C_6H_4$)$SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate (B($C_6H_5$)$_4^-$), or trispentafluoroethyl trifluorophosphate (P($C_2F_5$)$_3F_3^-$).

In another embodiment, as the anion, the anion represented by Formula 3 or bis(fluorosulfonyl)imide may be used.

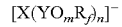 [Formula 3]

In Formula 3, X is a nitrogen atom or a carbon atom, Y is a carbon atom or a sulfur atom, $R_f$ is a perfluoroalkyl group, m is 1 or 2, and n is 2 or 3.

In Formula 3, when Y is carbon, m may be 1, when Y is sulfur, m may be 2, when X is nitrogen, n may be 2, and when X is carbon, n may be 3.

The anion of Formula 3 or bis(fluorosulfonyl)imide exhibits a high electronegativity due to a perfluoroalkyl ($R_f$) group or a fluoro group, and includes a unique resonance structure, which forms a weak bond with a cation, thereby having hydrophobicity. Accordingly, the ionic compound may exhibit excellent compatibility with another component of the composition such as a polymer, and may provide a high antistatic ability with a small amount.

The $R_f$ of Formula 3 may be a perfluoroalkyl group having 1 to 20, 1 to 12, 1 to 8, or 1 to 4 carbon atoms, and in this case, the perfluoroalkyl group may have a linear, branched, or cyclic structure. The anion of Formula 3 may be a sulfonylmethide-, sulfonylimide-, carbonylmethide-, or carbonylimide-based anion, and preferably, one or a mixture of at least two of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide, or bispentafluoroethanecarbonylimide.

As the ionic compound, an organic salt including a quaternary ammonium such as N-ethyl-N,N-dimethyl-N-propylammonium, N,N,N-trimethyl-N-prop ylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium, or N-ethyl-N,N,N-trioctylammonium, phosphonium, pyridinium, imidazolium, pyrrolidinium, or piperidinium as a cation and the anionic component may be used, and when needed, the metal salt may be used in combination with the organic salt.

A content of the ionic compound in the pressure-sensitive adhesive composition may be approximately, but is not particularly limited to, for example, 0.01 to 10, 0.1 to 10, or 0.1 to 8 parts by weight relative to 100 parts by weight of the polymer. The ratio of the ionic compound may be changed in consideration of a desired antistatic property or compatibility between components.

The pressure-sensitive adhesive composition may further include a silane coupling agent. The coupling agent may be γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxy silane, γ-acetoacetatepropyl triethoxy silane, β-cyanoacetyl trimethoxy silane, β-cyanoacetyl triethoxy silane, or acetoxyaceto trimethoxy silane, which may be used alone or in combination of at least two thereof. For example, as the silane coupling agent, a silane coupling agent having an acetoacetate or β-cyanoacetyl group is preferably used. In the pressure-sensitive adhesive composition, the silane coupling agent may be included at 0.01 to 5 or 0.01 to 1 part by weight relative to 100 parts by weight of the polymer. In the above range, an appropriate increase in a pressure-sensitive adhesive strength and durability and reliability may be ensured.

The pressure-sensitive adhesive composition may further include a tackifier in an aspect of controlling a pressure-sensitive adhesive performance. The tackifier may be a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination of at least two thereof. The tackifier may be included in the composition at 1 to 100 parts by weight relative to 100 parts by weight of the copolymer. In the content range, a suitable addition effect and enhancement in compatibility and a cohesive strength may be ensured.

The pressure-sensitive adhesive composition may further include at least one additive selected from the group consisting of a coordinating compound capable of forming a coordinate bond with the antistatic agent, a photoinitiator, a multifunctional acrylate, an epoxy resin, a curing agent, a UV stabilizer, an antioxidant, a coloring agent, a reinforcing agent, a filler, a foaming agent, a surfactant, and a plasticizer as long as it does not affect the desired effect.

The pressure-sensitive adhesive composition may have a low speed peel-off strength to an adherend having surface energy of 30 mN/m or less in a state in which a crosslinking structure is implemented of approximately 1 to 40, 1 to 30, 1 to 20, or 1 to 10 gf/25 mm, and a high speed peel-off strength of approximately 10 to 150 or 10 to 100 gf/25 mm.

Here, the term "low speed peel-off strength" may be, for example, a peel-off strength measured at a peel-off angle of 180 degrees and a peel-off speed of 0.3 m/min, and the "high speed peel-off strength" may be a peel-off strength measured at a peel-off angle of 180 degrees and a peel-off speed of 30 m/min.

Specifically, each of the peel-off strength may be measured at the above-described peel-off angle and peel-off speed after the pressure-sensitive adhesive composition in which a crosslinking structure is implemented is adhered to an adherend having surface energy of 30 mN/m or less, maintained at a temperature of 23° C. and a relative humidity of 65% for 24 hours. A specific method of measuring the peel-off strength will be described in the following Example.

A method of measuring surface energy of the adherend may be a method of measuring known surface energy, but the present application is not particularly limited thereto. For example, the surface energy may be calculated by measuring a contact angle of the adherend, or may be measured using known surface energy measuring equipment. The surface energy of the adherend may be approximately, for example, 10 to 30 mN/m.

The pressure-sensitive adhesive composition may also have a ratio (H/L) of the high speed peel-off strength (H) to the low speed peel-off strength (L) of 1 to 20, 1 to 15, 5 to 15, or 7 to 13.

The pressure-sensitive adhesive composition may have a peel-off electrostatic discharge (ESD) generated when peeled from the adherend, that is, the adherend having surface energy of 30 mN/m or less at a peel-off angle of 180 degrees and a peel-off speed of 40 m/min in a state in which a crosslinking structure is implemented of 0.5 kV or less. The method of measuring a peel-off ESD will be described in the following Example.

When such low speed and high speed peel-off strengths and/or peel-off ESD are ensured, the pressure-sensitive adhesive composition may exhibit a suitable protective function to an adherend, may minimize occurrence of static electricity, and may be easily peeled at a high speed.

In another aspect, the present application provides a pressure-sensitive adhesive sheet. The pressure-sensitive adhesive sheet may be, for example, a protective film, and particularly, a protective film for an optical device.

For example, the pressure-sensitive adhesive sheet may be used as a protective film for an optical device such as a polarizing plate, a polarizer, a polarizer protective film, a viewing angle compensation film, or a brightness enhancing film. The terms "polarizer" and "polarizing plate" used herein are objects different from each other. That is, the polarizer refers to a film, sheet, or device exhibiting a polarizing function, and the polarizing plate refers to an optical device including another component in addition to the polarizer. As another factor that can be included in the optical device in addition to the polarizer, a polarizer protective film or a retardation film may be used, but the present application is not limited thereto.

The pressure-sensitive adhesive sheet may include, for example, a base film for protecting a surface and a pressure-sensitive adhesive layer present on one surface of the base film. The pressure-sensitive adhesive layer may include, for example, a crosslinked pressure-sensitive adhesive composition, that is, a pressure-sensitive adhesive composition in which a crosslinking structure is implemented, as the pressure-sensitive adhesive composition.

The pressure-sensitive adhesive composition exhibits a relatively high low speed peel-off strength and a relatively low high speed peel-off strength after a crosslinking structure is implemented, excellent balance between the peel-off strengths, and excellent durability and reliability, workability, transparency, and an antistatic property. Accordingly, the protective film may be effectively used as a surface protective film to protect various types of optical devices or parts, or display devices or parts, for example, a surface of an optical device such as a polarizing plate, a retardation plate, an optical compensation film, a reflective sheet, and a brightness enhancing film used in an LCD, but the above uses are not limited to the protective film.

As the base film for protecting a surface, a general film or sheet known in the art may be used. For example, the base film for protecting a surface may be a plastic film such as a polyester film formed of polyethyleneterephthalate or polybutyleneterephthalate, a polytetrafluoroethylene film, a polyethylene film, a polypropylene film, a polybutene film, a polybutadiene film, a poly(vinyl chloride) film, or a polyimide film. Such a film may be composed of a single layer, or a stacked structure of at least two layers, and in some cases, further include a functional layer such as an antistaining layer or an antistatic layer. In addition, to enhance base cohesion, surface treatment such as primer treatment may be performed on one or both surfaces of the base.

A thickness of the base film is suitably selected according to a use, and may be conventionally, but is not particularly limited to, 5 to 500 or 10 to 100 µm.

A thickness of the pressure-sensitive adhesive layer included in the pressure-sensitive adhesive sheet may be approximately, but is not particularly limited to, for example, 2 to 100 or 5 to 50 µm.

A method of forming the pressure-sensitive adhesive layer may be, but is not particularly limited to, for example, coating a pressure-sensitive adhesive composition or a coating solution prepared thereof on a base film using a conventional means such as a bar coater and curing the coated pressure-sensitive adhesive composition or coating solution, or coating the a pressure-sensitive adhesive composition or a coating solution on a surface of a peelable base and curing the coated pressure-sensitive adhesive composition or coating solution and then transferring the coated pressure-sensitive adhesive composition or coating solution to the base film.

A process of forming the pressure-sensitive adhesive layer may be performed after a volatile component, or a bubbling component such as a reaction residue in the pressure-sensitive adhesive composition or coating solution is sufficiently removed. Accordingly, problems of reducing an elastic modulus due to an excessively low crosslinking density or a molecular weight of the pressure-sensitive adhesive, and forming a scatterer in the pressure-sensitive adhesive layer due to increasing bubbles present between a glass plate and a pressure-sensitive adhesive layer at a high temperature may be prevented.

In the above process, a method of curing the pressure-sensitive adhesive composition is not particularly limited, either, and may be performed through a suitable aging process that can react a polymer with a crosslinking agent included in the composition, or light radiation, for example, UV radiation that can induce activation of a photoinitiator therein.

The pressure-sensitive adhesive layer may have, for example, a gel content of approximately 80 to 99%. The gel content may be calculated by, for example, Expression 1:

Gel content=$B/A$×100    [Expression 1]

In Expression 1, A is a mass of the pressure-sensitive adhesive, and B is a dry mass of an insoluble content recovered after the pressure-sensitive adhesive is dipped in ethyl acetate at room temperature for 48 hours.

In still another aspect, the present application provides an optical device. The illustrative optical device may include an optical element, and the pressure-sensitive adhesive sheet adhered to a surface of the optical element. For example, a pressure-sensitive adhesive layer of the pressure-sensitive adhesive sheet is adhered to a surface of the optical element, and therefore the optical element may be protected by the base film for protecting a surface.

The optical element included in the optical device may be, for example, a polarizer, a polarizing plate, a polarizer protective film, a retardation layer, or a viewing angle compensation layer.

Here, as the polarizer, for example, a general type known in the art such as a polyvinylalcohol polarizer may be employed without limitation.

The polarizer is a functional film or sheet that can extract only light oscillating in one direction from incident light oscillating in various directions. Such a polarizer may be a form in which a dichroic dye is adsorbed and oriented on a polyvinylalcohol-based resin film. The polyvinylalcohol-based resin constituting a polarizer may be obtained by, for example, gelating a polyvinylacetate-based resin. In this case, in the polyvinylacetate-based resin that can be used, in addition to a homopolymer of vinyl acetate, a copolymer of vinyl acetate and a different monomer that can be copolymerized therewith may be included. Here, an example of a monomer that can be polymerized with vinyl acetate may be, but is not limited to, one or a mixture of at least two of unsaturated carbonic acids, olefins, vinyl ethers, unsaturated sulfonic acids, and acryl amides having an ammonium group. A degree of gelation of the polyvinyl alcohol-based resin may be approximately 85 to 100 mol %, and preferably 98 mol % or more. The polyvinyl alcohol-based resin may be further modified, and for example, polyvinyl formal or polyvinyl acetal modified by aldehydes may also be used. In addition, a degree of polymerization of the polyvinyl alcohol-based resin may be approximately 1,000 to 10,000, and preferably 1,500 to 5,000.

A disc-shape film of the polarizer is formed using the polyvinyl alcohol-based resin. A method of forming a film using a polyvinyl alcohol-based resin may be, but is not particularly limited to, a general method known in the art. A thickness of the disc-shape film formed of the polyvinyl alcohol-based resin may be, but is not particularly limited to, for example, suitably controlled within a range of 1 to 150 µm. In consideration of stretching feasibility, the thickness of the disc-shape film may be controlled to 10 µm or more. The polarizer may be manufactured by a process of extending (e.g., uniaxial orientation) the polyvinyl alcohol-based resin film, a process of dying the polyvinyl alcohol-based resin film with a dichroic dye and adsorbing the dichroic dye, a process of treating the polyvinyl alcohol-based resin film to which the dichroic dye is adsorbed with a boric acid aqueous solution, and a process of washing the polyvinyl alcohol-based resin film after treated with a boric acid aqueous solution. Here, as the dichroic dye, iodine or a dichroic organic pigment may be used.

The polarizing plate may include, for example, the polarizer; and another optical film adhered to one or both surfaces of the polarizer. Here, as another optical film, the above-described polarizer protective film, a retardation layer, a viewing angle compensation layer, or an antiglare layer may be used.

Here, the polarizer protective film may be a protective film to the polarizer to be distinguished from the protective film including the pressure-sensitive adhesive layer. As the polarizer protective film, for example, a multilayer film may be formed in such a manner that a protective film composed of a cellulose-based film such as triacetyl cellulose; an acryl film; a polyester-based film such as a polycarbonate film or polyethyleneterephthalate film; a polyethersulfone-based film; and/or a polyolefin-based film such as a polyethylene film, a polypropylene film, a polyolefin film having a cyclic or norbornene structure, or an ethylene propylene copolymer is stacked. A thickness of the protective film is not particularly limited, either, and therefore the protective film may be formed to a conventional thickness.

A surface treatment layer may be present on a surface of the optical element protected by the protective film in the optical device. The surface treatment layer may have surface energy of, for example, 30 mN/m or less. That is, in the optical device, the surface treatment layer having surface energy of 30 mN/m or less may be formed on a surface of the optical element protected by the protective film, and the pressure-sensitive adhesive layer of the protective film may be adhered to the surface treatment layer.

The surface treatment layer may be a high hardness layer, an a glariness preventing layer such as an antiglare (AG) layer or a semi-glare (SG) layer, or a low reflection layer such as an anti-reflection (AR) layer or a low-reflection (LR) layer.

The high hardness layer may be a layer having a pencil hardness under a load of 500 g of 1H or more or 2H or more. The pencil hardness may be measured, for example, using a pencil lead regulated in KS G2603 according to ASTM D 3363.

The high hardness layer may be, for example, a high-hardness resin layer. The resin layer may include, for example, a room temperature-curable, moisture-curable, heat-curable, or active energy ray-curable resin composition in a cured state. In one embodiment, the resin layer may include a heat-curable or active energy ray-curable resin composition, or an active energy ray-curable resin composition in a cured state. In the description of the high hardness layer, the "cured state" may mean a state in which components included in each resin composition are subjected to crosslinking or polymerization, and therefore the resin composition is converted into a hard state. In addition, here, the room temperature-curable, moisture-curable, heat-curable, or active energy ray-curable resin composition may be a composition which is cured at room temperature, or cured by irradiation of heat or active energy rays under suitable humidity.

Various resin compositions that can satisfy the pencil hardness in the above-described range in a cured state are known in the art, and one of ordinary skill in the art may easily select a suitable resin composition.

In one embodiment, the resin composition may include an acryl compound, an epoxy compound, a urethane compound, a phenol compound, or a polyester compound as a main component. The "compound" may be a monomeric, oligomeric, or polymeric compound.

In one embodiment, the resin composition may be an acryl resin composition having an excellent optical characteristic such as transparency and excellent resistance to yellowing, for example, an active energy ray-curable acryl resin composition.

The active energy ray-curable acryl composition may include, for example, an active energy ray polymerizable polymer component and a monomer for reactive dilution.

The polymer component may be a component known in the art as an active energy ray-polymerizable oligomer such as urethane acrylate, epoxy acrylate, ether acrylate, or ester acrylate, or a polymer of a mixture including a monomer such as a (meth)acrylic ester monomer. Here, the (meth) acrylic ester monomer may be an alkyl (meth)acrylate, a (meth)acrylate having an aromatic group, a heterocyclic (meth)acrylate, or alkoxy (meth)acrylate. Various polymer components to prepare an active energy ray-curable composition are known in the art, and the above-described compound may be selected according to necessity.

As the monomer for reactive dilution that can be included in the active energy ray-curable acryl composition may be a monomer having one or at least two of an active energy ray-curable functional group, for example, an acryloyl group or a methacryloyl group. As the monomer for reactive dilution, for example, the (meth)acrylic ester monomer or a multifunctional acrylate may be used.

Selection of the component to prepare the active energy ray-curable acryl composition or a mixing ratio of the selected component is not particularly limited, and may be controlled in consideration of hardness and other physical properties of a desired resin layer.

As the glariness preventing layer such as an AG layer or an SG layer, for example, a resin layer having an uneven surface, or a resin layer including particles that have a different refractive index from that of the resin layer may be used.

Here, as the resin layer, for example, a resin layer used to form the high hardness layer may be used. When the glariness preventing layer is formed, it is not necessary to control components of a resin composition for the resin layer to have a high hardness, but the resin layer may be formed to exhibit a high hardness.

Here, a method of forming an uneven surface on the resin layer is not particularly limited. For example, the resin composition may be cured while a coating layer of the resin composition is in contact with a desired mold having an uneven structure, or an uneven structure may be implemented by mixing particles having suitable particle sizes with a resin composition, and coating and curing the mixture.

Also, the glariness preventing layer may be implemented using particles having a different refractive index from that of the resin layer.

In one embodiment, the particles may have a difference in refractive index with the resin layer of 0.03 or less, or 0.02 to 0.2. When the difference in refractive index is excessively small, it is difficult to induce a haze, and when the difference in refractive index is excessively large, scattering occurs a lot in the resin layer, and therefore a haze is increased, but a decrease in light transitivity or a contrast characteristic may be induced. By considering these aspects, suitable particles may be selected.

A shape of the particle included in the resin layer may be, but is not particularly limited to, for example, spherical, oval, polygonal, amorphous, or other shapes. The particle has an average diameter of 50 to 5,000 nm. In one embodiment, as the particles, particles having an uneven surface may be used. Such particles may have, for example, an average surface roughness (Rz) of 10 to 50 nm or 20 to 40 nm, and/or the maximum height of a bump on the uneven surface of approximately 100 to 500 nm or 200 to 400 nm, and a width between bumps of approximately 400 to 1,200 nm or 600 to 1,000 nm. Such particles have excellent compatibility with the resin layer or dispersibility in the resin layer.

As the particles, various inorganic or organic particles may be used. The inorganic particles may be silica, amorphous titania, amorphous zirconia, indium oxide, alumina, amorphous zinc oxide, amorphous cerium oxide, barium oxide, calcium carbonate, amorphous barium titanate, or barium sulfate, and the organic particles may be particles including a crosslinking product or non-crosslinking product of an organic material such as an acryl resin, a styrene resin, an urethane resin, a melamine resin, a benzoguanamine resin, an epoxy resin, or a silicon resin, but the present application is not limited thereto.

The uneven structure formed on the resin layer or the content of the particles is not particularly limited. The shape of the uneven structure or the content of the particles may be controlled to have a haze of the resin layer of approximately 5 to 15%, 7 to 13%, or 10% for the AG layer, or approximately 1 to 3% for the SG layer. The haze may be measured using a hazemeter such as HR-100 or HM-150 commercially available from Sepung according to a manufacturer's manual.

The low reflection layer such as the AR or LR layer may be formed by coating a low refractive material. Various low refractive materials capable of forming the low reflection layer are known, and may be suitably selected and used for the optical device. The low reflection layer may be formed to have a reflectance of approximately 1% or less by coating a low refractive material.

To form a surface treatment layer, a material disclosed in Korean Unexamined Patent Application No. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801, or 2009-0049557 may also be used.

One or a combination of at least two of the surface treatment layers may be formed. The combination may be formed by forming a high hardness layer on a surface of a base layer, and forming a low reflection layer thereon.

In yet another aspect, the present application provides a display device, for example, a liquid crystal display (LCD). The illustrative display device may include a liquid crystal panel, and the optical device which is adhered on one or both surfaces of the liquid crystal panel. The film may be adhered to the liquid crystal panel using, for example, an adhesive or a pressure-sensitive adhesive. Here, the adhesive or pressure-sensitive adhesive is one except a pressure-sensitive adhesive present in the above-described protective film.

A type of the liquid crystal panel included in the LCD is not particularly limited. For example, the type of the liquid crystal panel is not limited, and all types of known liquid crystal panels including all types of passive matrix panels including a twisted nematic (TN)-mode, super twisted nematic (STN)-mode, ferroelectric (F)-mode, and polymer dispersed LCD (PD LCD)-mode panels; all types of active matrix panels including a two terminal-mode and three terminal-mode panels; an IPS-mode panel; and a vertically aligned (VA)-mode panel may be applied. In addition, types of other components included in the LCD and a method of manufacturing the same are not particularly limited, either, and therefore general components known in the art may be employed without limitation.

Effect

A pressure-sensitive adhesive composition of the present application can exhibit suitable low speed and high speed peel-off strengths after forming a crosslinking structure, and have an excellent balance between them. Accordingly, the pressure-sensitive adhesive composition can exhibit an excellent protective effect when applied to a protective film, can be easily peeled in a high speed peel-off and thus advantageous for the high speed process, and can exhibit an excellent antistatic characteristic.

ILLUSTRATIVE EMBODIMENTS

Hereinafter, a pressure-sensitive adhesive composition will be described in detail with reference to examples and comparative examples, but the scope of the pressure-sensitive adhesive composition is not limited to the following examples.

1. Measurement of Low Speed Peel-Off Strength

A pressure-sensitive adhesive sheet manufactured in Example or Comparative Example was adhered to a glariness preventing layer of a polarizing plate using a 2 Kg roller according to JIS Z 0237. Subsequently, the pressure-sensitive adhesive sheet was maintained at a temperature of 23° C. and a relative humidity of 65% for 24 hours, and cut to have a size of 25 mm×120 mm (width×length), thereby preparing a sample. Afterward, the sample was fixed on a glass substrate, and the pressure-sensitive adhesive sheet was peeled from the glariness preventing layer in a horizontal direction using a tensile tester at a peel-off angle of 180 degrees and a peel-off speed of 0.3 m/min to measure a peel-off strength. The peel-off strength was measured with respect to two identical samples, and then an average was obtained.

2. Measurement of High Speed Peel-Off Strength

A pressure-sensitive adhesive sheet manufactured in Example or Comparative Example was adhered to a glariness preventing layer of a polarizing plate using a 2 Kg roller according to JIS Z 0237. Subsequently, the pressure-sensitive adhesive sheet was maintained at a temperature of 23° C. and a relative humidity of 65% for 24 hours, and cut to have a size of 25 mm×250 mm (width×length), thereby preparing a sample. Afterward, the sample was fixed on a glass substrate, and the pressure-sensitive adhesive sheet was peeled from the glariness preventing layer in a horizontal direction using a tensile tester at a peel-off angle of 180 degrees and a peel-off speed of 30 m/min to measure a peel-off strength. The peel-off strength was measured with respect to two identical samples, and then an average was obtained.

3. Measurement of Peel-Off Electrostatic Discharge (ESD)

A sample was prepared by the same method as described in the measurements of low speed and high speed peel-off strengths, except that the sample had a size of approximately 22 cm×25 cm (width×length). Subsequently, the sample was fixed on a glass substrate, and a pressure-sensitive adhesive sheet of the sample was peeled using a tensile tester at a peel-off angle of approximately 180 degrees and a peel-off speed of 40 m/min to measure peel-off ESD.

4. Staining after Removal of Pressure-Sensitive Adhesive Sheet

The pressure-sensitive adhesive sheet was peeled from the same sample used in the measurement of the low speed peel-off strength, and staining on a surface of an adherend due to static electricity was observed and evaluated according to the following criteria.

<Evaluation Criteria>

A: when staining did not occur on a surface of the adherend

B: when staining occurred on a surface of the adherend

Preparation Example 1. Preparation of Acryl Polymer (A)

A monomer mixture including 2-ethylhexyl acrylate (EHA), hydroxyethyl acrylate (HEA), and a compound (EO1) of Formula 1, in which T is an ethylene group and m (added mole ratio) is 9, in a weight ratio of 88:6:6 (EHA:HEA:EO1) was added to an 1 L reactor equipped with a cooling device to perform a reflux of a nitrogen gas and facilitate control of a temperature, and then ethyl acetate was added as a solvent at 100 parts by weight relative to 100 parts by weight of the monomer mixture. Subsequently, a nitrogen gas was purged for 1 hour to remove oxygen, a reaction initiator (AIBN: azobisisobutyronitrile) was added for a reaction for approximately 8 hours, and the reaction product was diluted with ethyl acetate. Therefore, an acryl polymer (A) was prepared.

Preparation Examples 2 to 4. Preparation of Acryl Polymers B to D

An acryl polymer was prepared by the same method as described in Example 1, except that a ratio of monomers used to prepare the polymer was changed as shown in Tables 1 and 2

TABLE 1

| | Preparation Example | | | |
|---|---|---|---|---|
| | 1 | 2 | 3 | 4 |
| Polymer | A | B | C | D |
| EHA | 88 | 82 | 89 | 88 |
| BA | | 5 | | |
| HEA | 6 | 8 | | |
| HBA | | | 6 | |
| EO1 | 5 | | 5 | 12 |
| EO2 | | 4 | | |
| Solid | 45 | 45 | 45 | 45 |
| Viscosity | 2500 | 2500 | 2700 | 3200 |

Content unit: parts by weight
Solid content unit: wt %
Viscosity unit: cP
EHA: 2-ethylhexyl acrylate
BA: butyl acrylate
HBA: 4-hydroxybutyl acrylate
HEA: 2-hydroxyethyl acrylate
EO1: compound of Formula 1 in which T is an ethylene group, m (added mole ratio) is 9
EO2: compound of Formula 1 in which T is an ethylene group, m (added mole ratio) is 2

Example 1

Preparation of Pressure-Sensitive Adhesive Composition

A pressure-sensitive adhesive composition was prepared by uniformly mixing 5.0 parts by weight of a mixture (MHG-80B, Asahi) of an isophorone diisocyanate-based crosslinking agent and a hexamethylene diisocyanate-based crosslinking agent as a crosslinking agent and 0.3 parts by weight of lithium bis(trifluoromethanesulfonyl)imide (LiTFSi) relative to 100 parts by weight of the acryl polymer (A) of Preparation Example 1, and diluting the resulting mixture to have a suitable concentration in consideration of coatability.

Manufacture of Pressure-Sensitive Adhesive Sheet

A uniform coating layer was formed to have a thickness of approximately 23 μm by coating and drying the prepared pressure-sensitive adhesive composition on one surface of a poly(ethylene terephthalate) (PET) film (thickness: 38 μm). Subsequently, the coating layer was maintained at approximately 90° C. for 3 minutes to induce a crosslinking reaction, thereby manufacturing a pressure-sensitive adhesive sheet.

Example 2 and Comparative Examples 1 to 3

Pressure-sensitive adhesive compositions were prepared by the same method as described in Example 1, except that component ratios of the respective pressure-sensitive adhesive composition were changed as shown in Table 2.

TABLE 2

| | | Example | | Comparative Example | | |
|---|---|---|---|---|---|---|
| | | 1 | 2 | 1 | 2 | 3 |
| Polymer | Type | A | B | A | C | D |
| | Ratio | 100 | 100 | 100 | 100 | 100 |
| Crosslinking agent1 | Ratio | 5.0 | 5.0 | | 5.0 | 5.0 |
| Crosslinking agent 2 | Ratio | | | 5.0 | | |
| Li salt | Ratio | 0.3 | 0.5 | 0.5 | 0.5 | 1.0 |

Ratio unit: parts by weight
Crosslinking agent 1: aliphatic crosslinking agent (mixture of isophorone diisocyanate-based crosslinking agent and hexamethylene diisocyanate-based crosslinking agent) (MHG-80B, Asahi)
Crosslinking agent 2: aromatic crosslinking agent (Coronate L)
Type of Li salt: lithium bis(trifluoromethanesulfonyl)imide (LiTFSi)

Physical properties were evaluated with respect to the pressure-sensitive adhesive compositions of Examples and Comparative Examples, and summarized in Table 3.

TABLE 3

| | Example | | Comparative Example | | |
|---|---|---|---|---|---|
| | 1 | 2 | 1 | 2 | 3 |
| L-peel(unit: gf/25 mm) | 5 | 4.5 | 2.4 | 2.2 | 2.1 |
| H-peel(unit: gf/25 mm) | 80 | 80 | 70 | 81 | 80 |
| H-peel/L-peel | 16 | 18 | 29 | 37 | 38 |
| ESD(unit: kV) | 0.2 | 0.3 | 0.5 | 0.5 | 0.5 |
| Staining evaluation | A | A | A | A | A |

L-peel: low speed peel-off strength
H-peel: high speed peel-off strength

What is claimed is:
1. An optical device having a surface,
wherein a protective film is adhered to the surface,
wherein the protective film comprises a base film for protecting the surface and a pressure-sensitive adhesive layer on one surface of the base film,
wherein the pressure-sensitive adhesive layer comprises a crosslinked pressure-sensitive adhesive composition,
wherein the pressure-sensitive adhesive composition comprises: a polymer comprising a polymerization unit of a hydroxyalkyl (meth)acrylate in which an alkyl group has 1 carbon atom or 2 carbon atoms and a polymerization unit of a monomer represented by Formula 1; and an aliphatic isocyanate crosslinking agent,
wherein the polymer does not include a polymerization unit induced from a carboxyl group-containing monomer,
wherein crosslinking points of the polymer reacted with the crosslinking agent are only hydroxyl groups included in the polymerization unit of the hydroxyalkyl (meth)acrylate in which the alkyl group has 1 carbon atom or 2 carbon atoms or the polymerization unit of the monomer represented by Formula 1, wherein a weight ratio of the hydroxyalkyl (meth)acrylate in which the alkyl group has 1 carbon atom or 2 carbon atoms with respect to the monomer of Formula 1 in the polymer is more than 1 and not more than 5, and wherein the surface of the optical device has a surface energy of 30 mN/m or less, and the pressure-sensitive adhesive layer of the protective film is directly adhered on the surface having the surface energy of 30 mN/m or less:

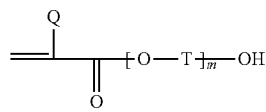

[Formula 1]

where the "Q" is hydrogen or an alkyl group, the "T" is an alkylene group, the "m" is a number ranging from 1 to 16, and a multiplication (m×c) of the "m" and the number (c) of carbon atoms in the alkylene group of the "T" is 4 or more.

2. The optical device according to claim 1, wherein the multiplication (m×c) of the "m" and the number (c) of carbon atoms in the alkylene group of the "T" ranges from 4 to 20.

3. The optical device according to claim 1, wherein, in Formula 1, the "Q" is an alkyl group having 1 to 8 carbon atoms.

4. The optical device according to claim 1, wherein the polymer comprises a polymerization unit of 1 to 10 parts by weight of the hydroxyalkyl (meth)acrylate in which the alkyl group has 1 carbon atom or 2 carbon atoms and 1 to 10 parts by weight of the monomer of Formula 1.

5. The optical device according to claim 1, wherein the polymer further comprises a polymerization unit of an alkyl (meth)acrylate.

6. The optical device according to claim 1, wherein the aliphatic isocyanate crosslinking agent comprises at least one selected from the group consisting of an aliphatic cyclic isocyanate compound and an aliphatic non-cyclic isocyanate compound.

7. The optical device according to claim 6, wherein the aliphatic cyclic isocyanate compound is an isocyanate compound that is isophorone diisocyanate, methylene dicyclohexyl diisocyanate, or cyclohexane diisocyanate; a dimer or trimer of the isocyanate compound; or a reaction product of the isocyanate compound and a polyol.

8. The optical device according to claim 6, wherein the aliphatic non-cyclic isocyanate compound is an alkylene diisocyanate compound having 1 to 20 carbon atoms; a dimer or trimer of the isocyanate compound; or a reaction product of a polyol with the isocyanate compound.

9. The optical device according to claim 1, wherein the crosslinking agent is comprised in the pressure-sensitive adhesive composition in an amount from 0.01 to 10 parts by weight relative to 100 parts by weight of the polymer.

10. The optical device according to claim 1, wherein the pressure-sensitive adhesive composition further comprises an ionic compound.

11. The optical device according to claim 1, wherein the pressure-sensitive adhesive composition has a peel-off strength in a range from 1 to 40 gf/25 mm, and wherein the peel-off strength is measured at a peel-off angle of 180 degrees and a peel-off speed of 0.3 m/min with respect to an adherend having surface energy of 30 mN/m or less in a state where a crosslinking structure is realized in the pressure-sensitive adhesive composition.

12. The optical device according to claim 1, wherein the pressure-sensitive adhesive composition has a peel-off strength in a range from 10 to 150 gf/25 mm, and wherein the peel-off strength is measured at a peel-off angle of 180 degrees and a peel-off speed of 30 m/min with respect to an adherend having surface energy of 30 mN/m or less in a state where a crosslinking structure is realized in the pressure-sensitive adhesive composition.

13. The optical device according to claim 1, wherein the pressure-sensitive adhesive composition has a peel-off electrostatic discharge in a range of 0.5 kV or less, and wherein the peel-off electrostatic discharge is measured at a peel-off angle of 180 degrees and a peel-off speed of 40 m/min with respect to an adherend having surface energy of 30 mN/m or less in a state where a crosslinking structure is realized in the pressure-sensitive adhesive composition.

14. The optical device according to claim 1, wherein the surface having the surface energy of 30 mN/m or less is a high hardness layer having a pencil hardness of 1H or more, a glariness preventing layer, or an anti-reflection layer.

15. A display device, comprising the optical device of claim 1.

* * * * *